(12) United States Patent
Janesch

(10) Patent No.: US 6,518,801 B1
(45) Date of Patent: Feb. 11, 2003

(54) ALIAS SUPPRESSION METHOD FOR 1-BIT PRECISION DIRECT DIGITAL SYNTHESIZER

(75) Inventor: Stephen T. Janesch, Coopersburg, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/368,172

(22) Filed: Aug. 5, 1999

(51) Int. Cl.[7] .............................................. H03B 21/00
(52) U.S. Cl. ........................ 327/105; 327/317; 327/551
(58) Field of Search ................................ 341/143, 144; 327/45, 105, 106, 107, 116, 119, 141, 317, 551, 310, 379, 384; 708/313

(56) References Cited

U.S. PATENT DOCUMENTS

| | | | | |
|---|---|---|---|---|
| 3,662,160 A | * | 5/1972 | Hoppes | 708/270 |
| 4,296,279 A | * | 10/1981 | Stork | 704/264 |
| 5,140,540 A | * | 8/1992 | Cheney et al. | 364/718 |
| 5,208,596 A | * | 5/1993 | Dieterich | 341/144 |
| 5,475,605 A | * | 12/1995 | Lin | 716/18 |
| 5,781,044 A | * | 7/1998 | Riley et al. | 327/105 |
| 5,854,599 A | * | 12/1998 | Heo et al. | 341/143 |
| 5,864,492 A | * | 1/1999 | Sadot | 364/718.01 |
| 5,886,752 A | * | 3/1999 | Cross | 348/724 |
| 5,978,420 A | * | 11/1999 | Koslov et al. | 708/313 |
| 6,031,431 A | * | 2/2000 | Vinekar | 708/313 |
| 6,058,486 A | * | 5/2000 | Nakayama et al. | 345/502 |
| 6,066,967 A | * | 5/2000 | Cahill | 327/107 |

\* cited by examiner

*Primary Examiner*—Matthew Smith
*Assistant Examiner*—Paul Dinh
(74) *Attorney, Agent, or Firm*—William H. Bollman

(57) ABSTRACT

The present invention provides an improved apparatus and technique for removing alias signals from the output of a discretely timed circuit. Rather than simply lowpass filtering an output signal from a discretely timed circuit signal to remove aliases as in conventional discretely timed circuits, and instead of increasing the frequency of the clock signal in other conventional discretely timed circuits, the present invention provides for interpolation between clock edges, taking advantage of information in the digital representation, to reduce or eliminate many lower-order alias signal components. More particularly, the present invention eliminates lower-order aliases of a discretely timed circuit, e.g., of a 1-bit resolution direct digital synthesizer (DDS) by interpolating transitions within clock periods utilizing the period of the signal and its instantaneous phase, to improve the time resolution of the output signal. In a disclosed embodiment, a multiplier produces product of an output signal (e.g., from a phase accumulator) and its period (e.g., output from a period register). The disclosed interpolator includes a digital comparator and a varying reference generator, e.g., a ramp generator, together with an appropriate digital-to-analog converter, to set a threshold proportional to the phase-period product. If the product of the multiplier is greater than unity, a transition is prohibited. However, if the product of the multiplier is less than or equal to unity, a transition occurs, preferably within the next clock period.

18 Claims, 7 Drawing Sheets

1 BIT RESOLUTION DDS WITH INTERPOLATOR FOR ALIAS SUPPRESSION

1 BIT RESOLUTION DDS WITH INTERPOLATOR FOR ALIAS SUPPRESSION

CONTINUOUS TIME SINEWAVE AND DISCRETE-TIME EQUIVALENT (DAC OUT)

FREQUENCY SPECTRUM OF DISCRETE-TIME SINEWAVE SHOWING ALIASES ABOUT $k * F_{CLK}$

CONTINUOUS TIME SQUARE WAVE (SOLID LINE) AND
DISCRETE-TIME EQUIVALENT (DASHED LINE)

CONTINUOUS TIME PHASE AND SQUARE WAVE OUTPUT PLUS
DISCRETE-TIME PHASE ($\phi_{-2}$, $\phi_{-1}$, $\phi_0$, $\phi_1$,) AND SQUARE WAVE OUTPUT

ALIAS SUPPRESSION METHOD FOR 1-BIT PRECISION DIRECT DIGITAL SYNTHESIZER

BACKGROUND OF THE INVENTION

1. Field of the Invention

This invention relates generally to the reduction or elimination of alias signals in the outputs of discretely timed circuits. More particularly, it relates to an efficient apparatus and technique for reducing and even eliminating lower alias signals in a frequency domain.

2. Background of Related Art

All discretely timed circuits (i.e., having an input clock signal) have, in the frequency domain, copies of a desired output signal repeated above and below all harmonics of the clock frequency. These signal copies are known as aliases.

Exemplary discretely timed circuits, while by no means exclusive, include such circuits as a digital-to-analog converter (DAC), a switched capacitor filter, and/or a direct digital synthesizer (DDS).

To improve the fidelity of a discrete time signal in a continuous time application, a low pass filter forming an anti-alias filter is conventionally utilized on the output signal to remove undesired frequency components such as the alias signals.

For instance, FIG. 4 shows a block diagram of an exemplary discretely timed circuit, i.e., a DDS 300 forming an oscillator, and including a low pass filter 312 at an output to filter out undesired frequency components forming alias signals. The DDS 300 further includes a frequency register 302.

The frequency register 302 sets the output frequency of the DDS 300, an adder 304, and a phase accumulator 306. The setting in the frequency register 302 is added in the adder 304 each cycle to the feedback line from the phase accumulator 306. The phase accumulator accumulates or stores the output of the adder 304, dropping overflow values.

A look-up table is typically formed to output a desired wave shape. In the disclosed example, the desired output shape is sinusoidal. Thus, the desired look-up table is formed as a "cosine" memory, e.g., in Read Only Memory (ROM) 308. Based on the output of the phase accumulator 306, the cosine ROM 308 outputs digital values representing a voltage level of a sinusoidal waveform at the particular point in time. Of course, the cosine ROM 308 contains only discrete values along the desired waveform, but preferably the discrete nature is within the requirements of the particular application.

A digital-to-analog converter (DAC) 310 converts the discrete values output from the cosine ROM 308 into an analog signal, which would otherwise form the output signal from the DDS 300, but for the anti-alias low pass filter 312, which removes alias signals from the output signal.

The phase of the output of the DDS oscillator 300 is adjusted by a given amount each unit of time. For example, each cycle of the input clock signal Fclk, the phase accumulator 306 of the DDS 300 increments by the value stored in the frequency register 302. If the frequency register 302 has an n-bit value Fsyn stored therein, the frequency of the generated output signal is equal to $Fsyn*Fclk/(2**n)$.

The most significant m bits of the phase accumulator 306 are input to the cosine ROM 308, and the output of the cosine ROM 308 is input to the DAC 310 for output as an analog signal.

A conventional DDS, while generally equivalent in most applications to an oscillator, is nevertheless a digital, discrete-time, discrete-phase device.

FIG. 5A shows an exemplary output analog sinusoid having the desired frequency Fsyn (e.g., using an ideal DAC having infinite bandwidth and infinite resolution) superimposed on the actual resulting output of the discrete-time DDS 300. For simplicity of explanation, the discrete nature of the output signal shown in FIG. 5A is exaggerated.

FIG. 5B shows an exemplary resultant frequency spectrum of the discrete-time signal output from the DDS 300 shown in FIG. 4 based on the desired frequency output Fsyn shown in FIG. 5A. More particularly, FIG. 5B shows that, in addition to the desired tone at Fsyn, there are numerous alias components of the output signal at $k*Fclk+/-$ Fsyn.

For instance, note that in addition to the desired frequency output signal component 400, the output signal shown in FIG. 5B also includes alias components 402, 404 above and below one times the frequency of the input clock signal Fclk (components 402, and 404), alias components 406, 408 above and below two times the frequency of the input clock signal Fclk (components 406 and 408), alias components 410, 412 above and below three times the frequency of the input clock signal Fclk (components 410 and 412), etc.

As the desired output frequency Fsyn approaches one half the frequency of the input clock signal (i.e., Fclk/2) (designated by the arrow A), the Fclk-Fsyn alias also approaches Fclk/2 (designated by the arrow B), making the cutoff requirements of the anti-alias filter 312 that much more stringent, putting a practical upper limit on the usable output frequency of the DDS 300.

FIG. 6 shows a continuous-time square wave at the desired frequency Fsyn, and its discrete time equivalent as would be seen at the input to an otherwise conventional anti-alias filter. FIG. 7 shows an enlargement of the transitional region 302 shown in FIG. 6. Note from FIGS. 6 and 7 that the transitions are delayed until the next transition of the clock signal, which is the nature of a discrete time signal. These delays exacerbate the creation and propagation of alias components in the output signal.

As shown in FIG. 4, conventional removal of alias components, particularly those exacerbated and propagated by discretely timed circuits, requires the inclusion of a low pass filter 312, adding complexity, size and cost to conventional designs.

An alternative to the use of an anti-alias low pass filter is to increase the frequency of the input clock signal Fclk by at least several powers of two. However, while increasing the clock frequency does improve the time resolution to reduce or eliminate alias components, it does so at the disadvantage of increased power consumption proportional to the increase in clock frequency. In many applications, increased power consumption has other effects such as reduced operational time and thus decreased consumer demand.

There is thus a need for an improved apparatus and technique for eliminating alias signals without the need for a low pass filter and without increasing the frequency of the clock signal.

SUMMARY OF THE INVENTION

In accordance with the principles of the present invention, an interpolator having reduced alias signals in an output comprises a varying reference signal generator, a comparator, and a digital-to-analog converter. The comparator compares a level of an input signal to the varying reference signal generator, and causes the digital-to-analog converter to convert at a time when the input signal is at an equivalent level to the varying reference signal generator.

A method of removing an alias component in an output signal from a discretely timed circuit in accordance with another aspect of the present invention comprises prohibiting a transition in an output signal of the discretely timed circuit if a product of an output of a phase accumulator and a period value are greater than unity. A transition is allowed to occur in the output signal if the product is less than or equal to unity.

A method of removing an alias component in an output analog signal from a discretely timed circuit in accordance with yet another aspect of the present invention comprises intentionally moving a position of a transition in a digital signal in time in an interpolator, before conversion into an analog signal, based on a comparison of a desired signal to an input sample.

A method of removing low-order alias components from an output signal of a discretely timed circuit in accordance with still another aspect of the present invention comprises interpolating transitions within clock periods of a clock signal timing the discretely timed circuit, utilizing a period of the output signal and an instantaneous phase of the output signal, to improve a time resolution of the output signal.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an improved apparatus and technique for removing alias signals from the output of a discretely timed circuit.

In particular, rather than simply lowpass filtering an output signal from a discretely timed circuit signal to remove aliases as in conventional discretely timed circuits, and instead of increasing the frequency of the clock signal in other conventional discretely timed circuits, the present invention provides for interpolation between clock edges, taking advantage of information in the digital representation, to reduce or eliminate many lower-order alias signal components.

More particularly, the present invention eliminates lower-order aliases of a discretely timed circuit, e.g., of a 1-bit resolution direct digital synthesizer (DDS) by interpolating transitions within clock periods utilizing the period of the signal and its instantaneous phase, to improve the time resolution of the output signal.

The proof is as follows. Given a clock period Tclk and a phase increment Fsyn, the delay of the transition into the period Fdly (when the phase is zero) can be expressed as Equation (1):

$$\frac{Tdly}{Tclk} = \Phi_{-1} / F_{syn}$$

Substituting the period Tsyn for the reciprocal of Fsyn gives Equation (2):

$$\frac{Tdly}{Tclk} = \Phi_{-1} T_{syn}$$

This shows that the delay Tdly, relative to the clock period Tclk of a discretely timed circuit, can be expressed as the product of its phase (e.g., output from a phase accumulator of a DDS) and the period of the output signal (e.g., a synthesized tone output from a DDS).

The invention exploits this property to interpolate the transition within the clock period and eliminate lower-order aliases by improving the time resolution of the output.

Figure 1:
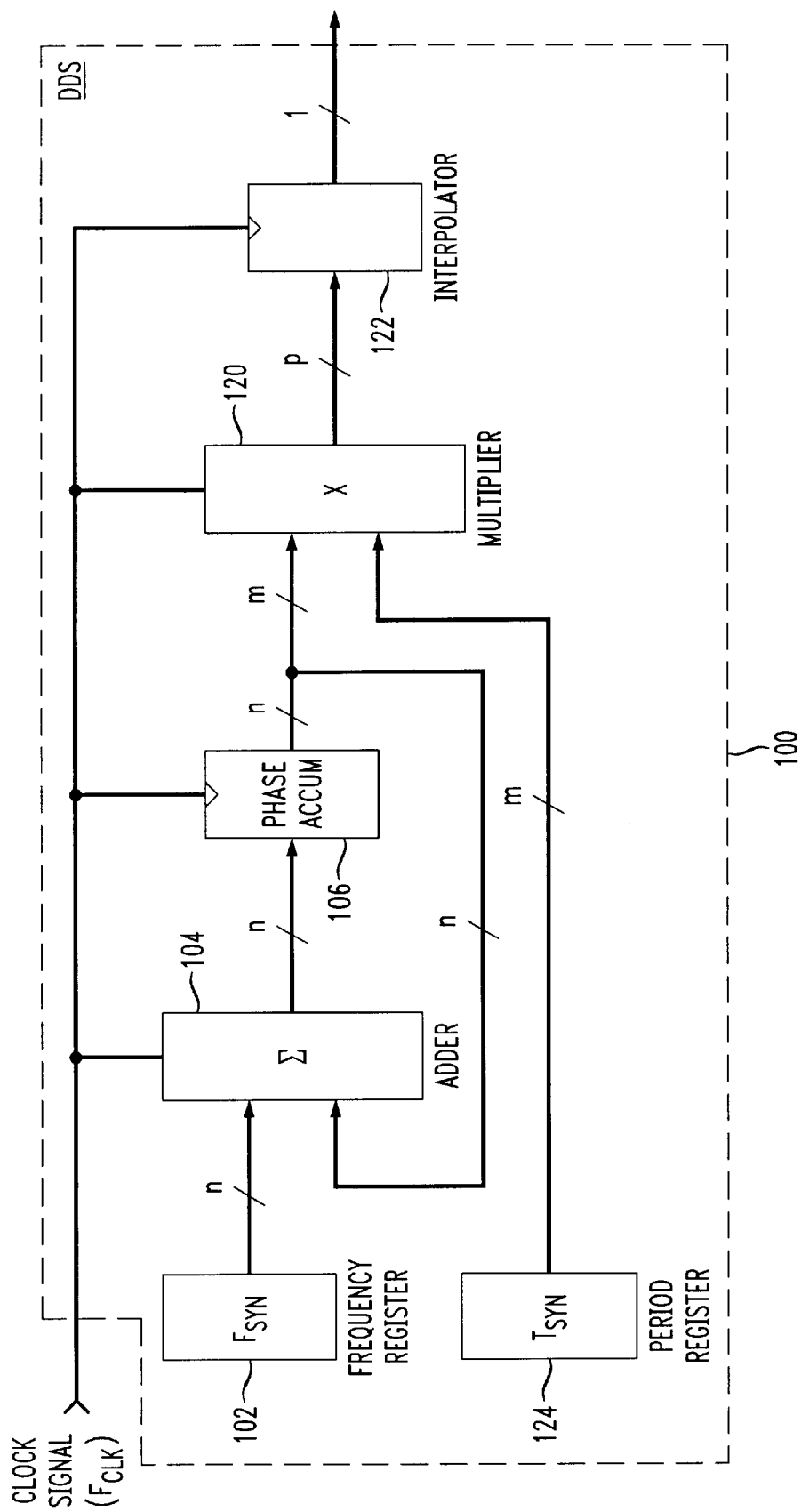
FIG. 1 shows an exemplary implementation of an antialias circuit and technique in accordance with the present invention in a 1-bit direct digital synthesizer (DDS).

FIG. 1 shows an exemplary implementation of an antialias circuit and technique in accordance with the present invention in a 1-bit direct digital synthesizer (DDS).

Figure 4:
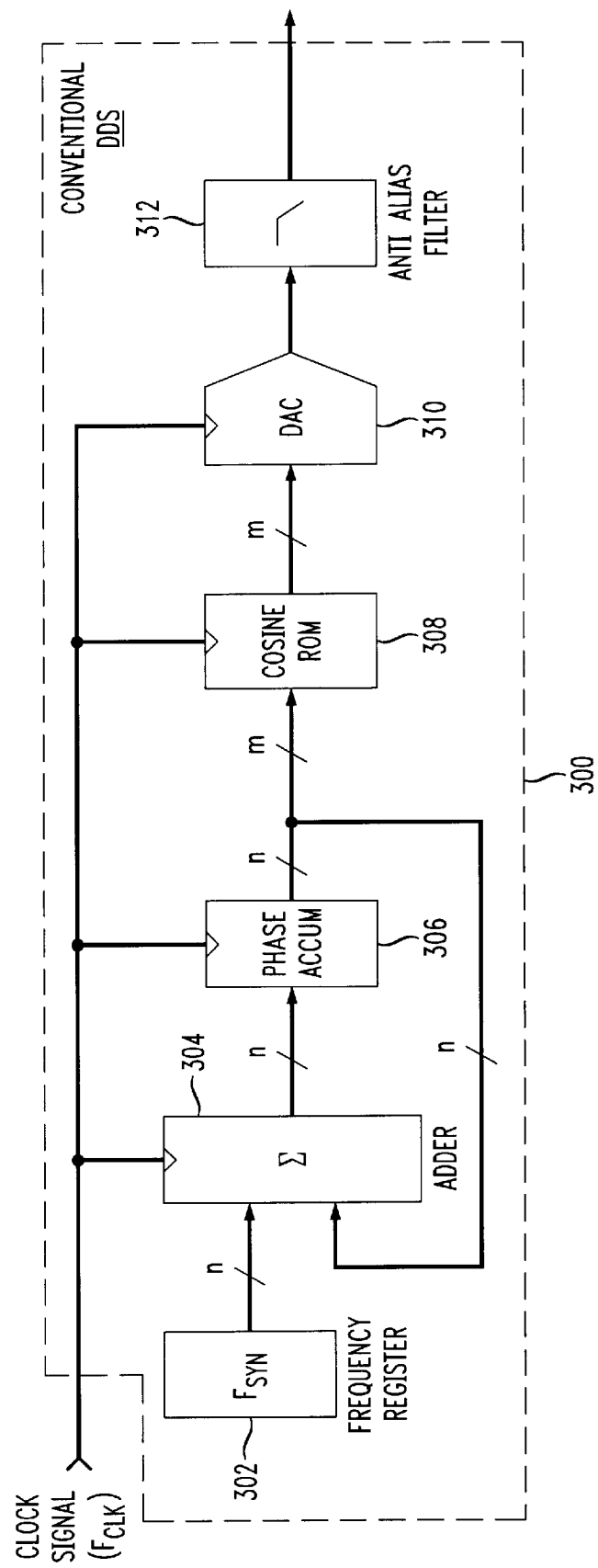
FIG. 4 shows a conventional direct digital synthesizer (DDS) wherein as an oscillator's phase increases by a given amount each clock cycle, a phase accumulator is incremented by the amount held in the frequency register each clock cycle, and a low-pass anti-alias filter is used to filter out alias components in the output signal.
Figure 5A:
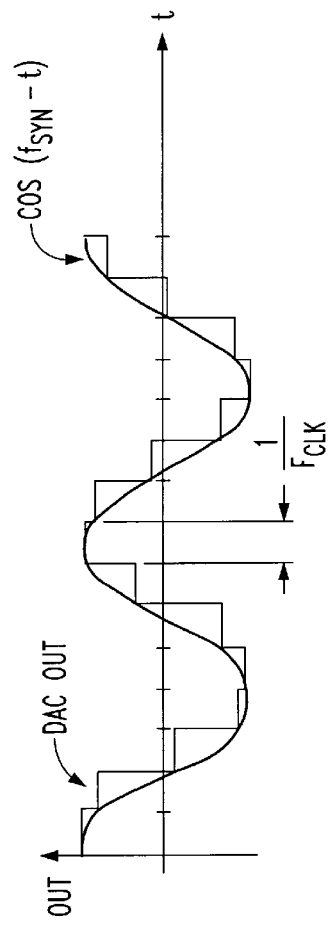
FIG. 5A shows an exemplary analog sinusoid output from the conventional DDS shown in FIG. 4, using an ideal (i.e., infinite bandwidth, infinite resolution) digital-to-analog converter.
Figure 5B:
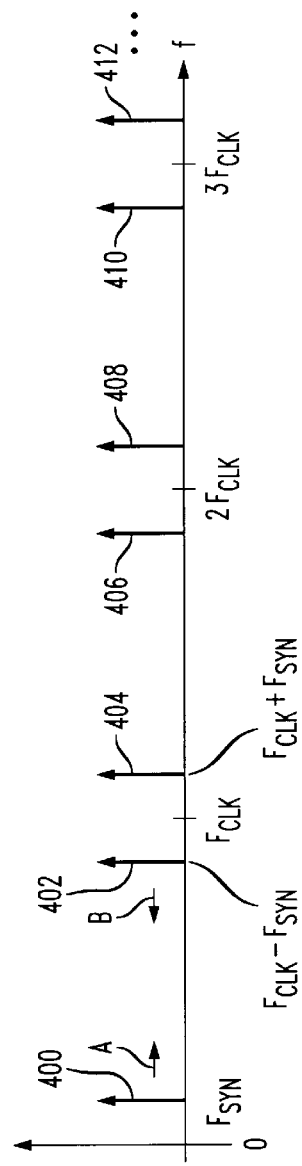
FIG. 5B shows an exemplary spectrum of the discrete-time signal shown in FIG. 5A wherein alias components are included in an signal output from the conventional DDS shown in FIG. 4.
Figure 6:
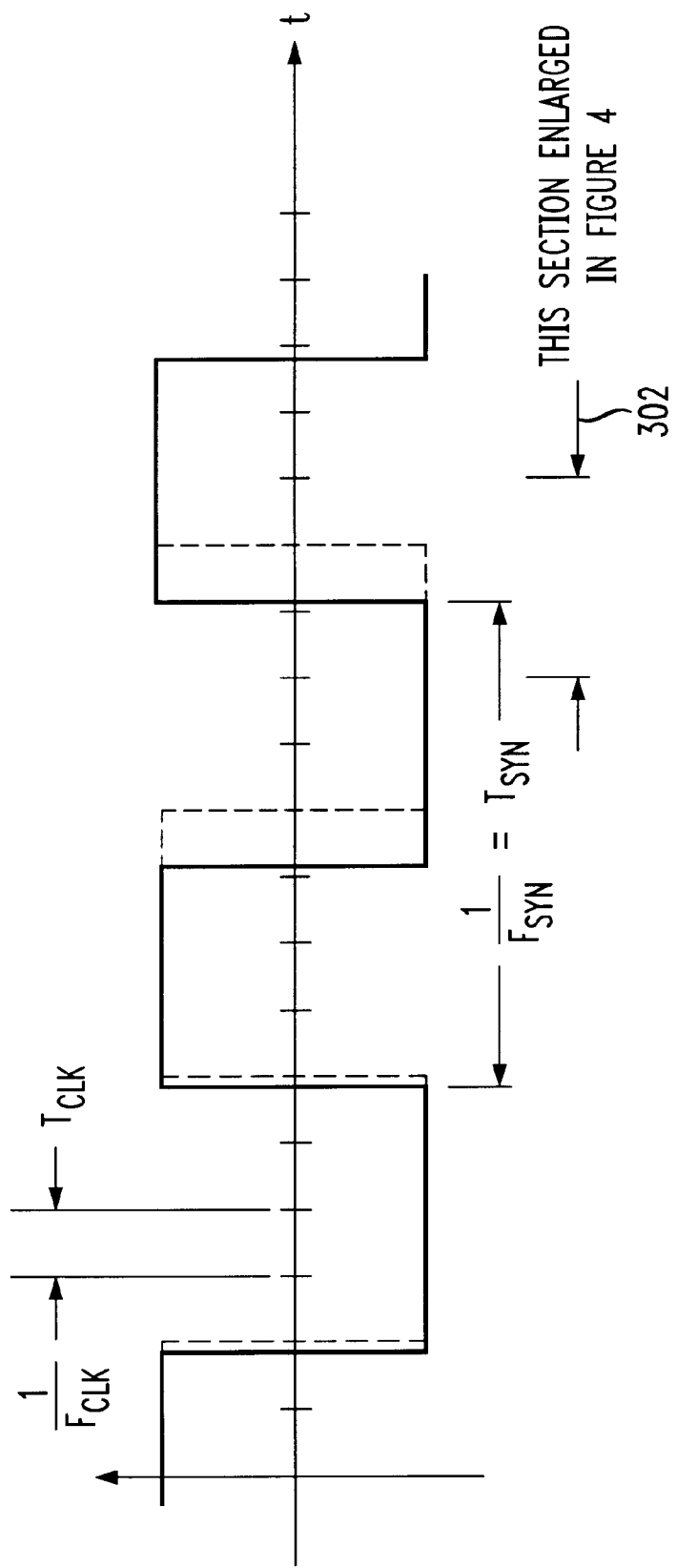
FIG. 6 shows a continuous-time square wave at the desired frequency, and its discrete time equivalent, as would be seen at the input to an otherwise conventional anti-alias filter.
Figure 7:
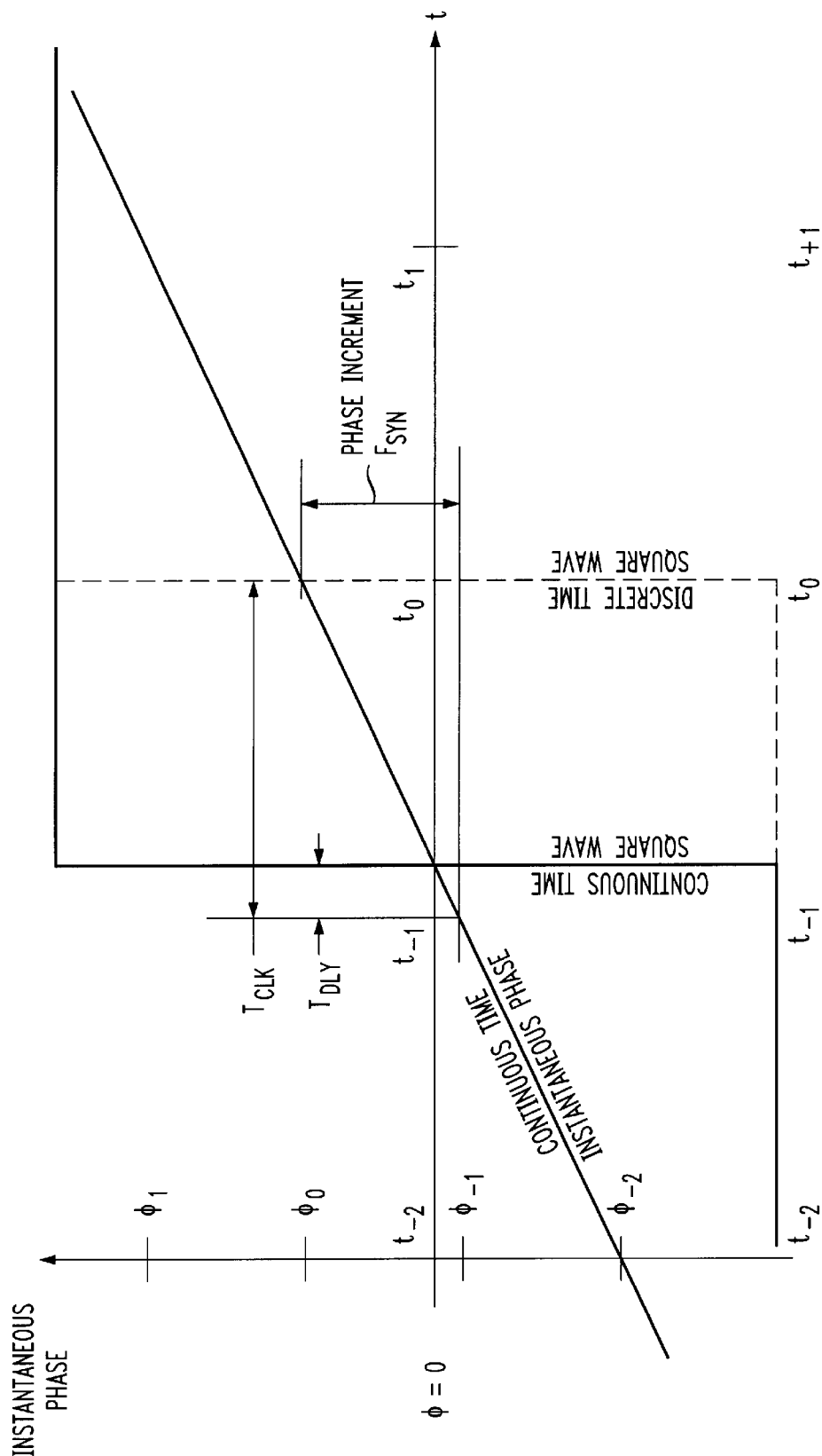
FIG. 7 shows an enlargement of the transitional region 302 shown in FIG. 6.

In particular, in FIG. 1, the output of a frequency register Fsy 102 and a phase accumulator 106 are added in an adder 104. The output of the adder 104 is input to a phase accumulator 106. This portion is somewhat similar to that of a conventional DDS, e.g., as shown in FIG. 4.

However, in accordance with the principles of the present invention, the output from the phase accumulator 106 is input to a multiplier 120. The multiplier 120 produces the product shown above in Equation (2) by multiplying the phase of the output signal (i.e., from the phase accumulator 106) with its period (i.e., output from a period register Tsyn 124). The period register Tsyn 124 stores the value for the period Tsyn relating to the desired signal (e.g., tone) to be synthesized.

Moreover, in accordance with the principles of the present invention, an interpolator 122, clocked by a clock signal Fclk, interpolates the output from the multiplier 120. The interpolator 122, while disclosed as a hardware embodiment, may alternatively be implemented in software using an appropriate processor.

Figure 2:
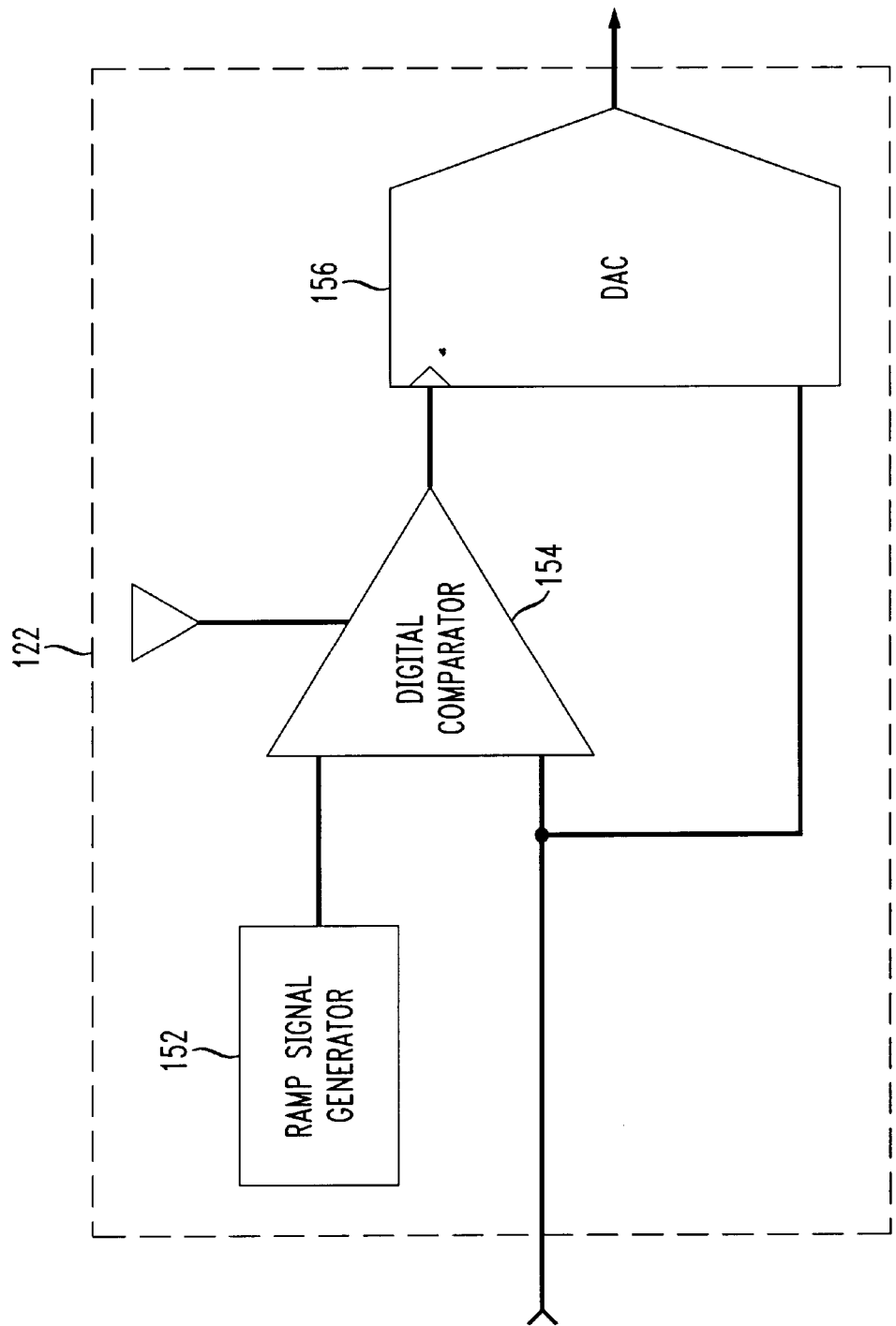
FIG. 2 shows in more detail an exemplary embodiment of the interpolator shown in FIG. 1.

FIG. 2 shows an exemplary embodiment of the interpolator 122 shown in FIG. 1 in more detail.

In particular, in FIG. 2, the interpolator 122 includes a digital comparator 154 and a varying reference generator, e.g., a ramp generator 152, together with an appropriate digital-to-analog converter 156. The interpolator 122 sets the threshold of the comparator 154 proportional to the phase-period product.

If the product of the multiplier 120 is greater than unity, a transition is prohibited. However, if the product of the multiplier 120 is less than or equal to unity, a transition occurs, preferably within the next clock period.

Figure 3:
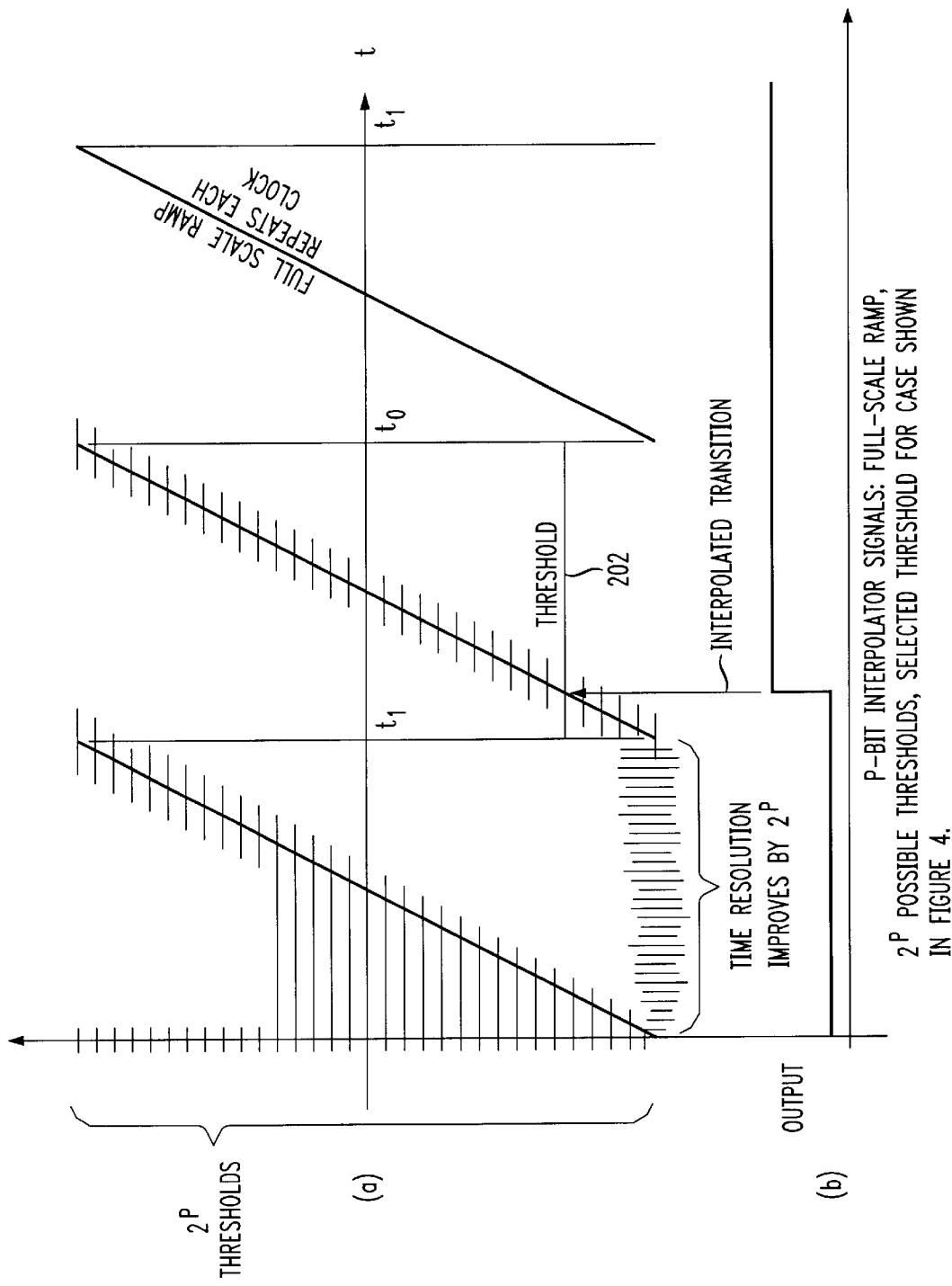
FIG. 3 illustrates exemplary waveforms useful for explaining the operation of the interpolator shown in FIG. 1. In particular, waveform (a) shows the output from the ramp generator rising each clock cycle, and the numerous (e.g., $2^P$) possible thresholds, including a selected threshold, and waveform (b) shows the point of the transition in the signal output from the interpolator (and thus from the discretely timed circuit, in accordance with the principles of the present invention.

FIG. 3 illustrates exemplary waveforms useful for explaining the operation of the interpolator 122 shown in FIG. 1.

In particular, waveform (a) of FIG. 3 shows the output from the ramp generator rising each clock cycle, and the numerous (e.g., $2^P$) possible thresholds, including a threshold 202 selected by the instantaneous value of the input signal.

Waveform (b) of FIG. 3 shows the point of the transition in the signal output from the interpolator 122 (and thus from the discretely timed circuit), in accordance with the principles of the present invention. Note that as the selected threshold changes, so too does the point in time of the transition of the signal output from the interpolator 122.

The present invention recognizes that in certain applications, e.g., in the case of a DDS whose output resolution is a single bit, the output signal will typically be a desired homogenous frequency, e.g., at the frequency Fsyn, albeit perhaps changing frequently. In such a 1-bit application, the present invention not only improves upon the resolution conventionally provided by a DDS, it also eliminates the need for both a conventional cosine ROM 308 and a conventional DAC 310 as otherwise shown in FIG. 4.

Major advantages to the present invention over conventional devices and techniques are the use of a low clock frequency, leading to a lower current (and thus power consumed) required for the given time resolution. Moreover, the present invention offers a practical way to do non-integer frequency division, particularly near Fclk/2, without requiring additional anti-alias filtering, but while maintaining 50% duty cycle and a high degree of time resolution.

While the invention has been described with reference to the exemplary embodiments thereof, those skilled in the art will be able to make various modifications to the described embodiments of the invention without departing from the true spirit and scope of the invention.

What is claimed is:

1. A method of removing an alias component in an output signal from a discretely timed circuit, comprising:

prohibiting a transition in an output signal of said discretely timed circuit if a product of a phase of a phase accumulator and a period of a register are greater than one; and allowing a transition in said output signal to occur if said product is less than or equal to one.

2. The method of removing an alias component in an output signal from a discretely timed circuit according to claim 1, wherein:

said transition is allowed in said output signal within a next clock period from which said product is derived.

3. The method of removing an alias component in an output signal from a discretely timed circuit according to claim 1, wherein:

said discretely timed circuit includes a direct digital synthesizer.

4. A method of removing an alias component in an output analog signal from a discretely timed circuit, comprising:

utilizing a multiplier to produce a product of a phase accumulator signal and a period register signal for output to an interpolator; and intentionally moving in said interpolator a position of a transition in time in a digital signal output from said discretely timed circuit, before conversion into an analog signal, based on a comparison of a desired signal to an input sample of said digital signal.

5. The method of removing an alias component in an output analog signal from a discretely timed circuit according to claim 4, wherein:

said interpolator interpolates between a value of a desired output signal and a varying reference signal.

6. A method of removing an alias component in an output analog signal from a discretely timed circuit, comprising:

comparing a desired signal to an input sample of a digital signal output from said discretely timed circuit;

intentionally moving in said interpolator a position of a transition in time in said digital signal, before conversion into an analog signal, based on said comparison of said desired signal to an input sample of said digital signal;

whereby said interpolator interpolates between a value of a desired output signal and a varying reference signal; and said varying reference signal is a ramp signal.

7. A method of removing an alias component in an output analog signal from a discretely timed circuit, comprising:

comparing a desired signal to an input sample of a digital signal;

intentionally moving a position of a transition in said digital signal in time in an interpolator, before conversion into an analog signal, based on said comparison of said desired signal to an input sample of said digital signal;

whereby said interpolator interpolates between a value of a desired output signal and a varying reference signal;

said varying reference signal is a ramp signal; and said ramp signal repeats each clock cycle.

8. The method of removing an alias component in an output analog signal from a discretely timed circuit according to claim 4, wherein:

said interpolator inputs a digital signal and outputs an analog signal.

9. A method of removing low-order alias components from an output signal of a direct digital synthesizer, comprising:

obtaining a period of a register;

obtaining an instantaneous phase of a phase accumulator;

interpolating transitions within clock periods of a clock signal timing a direct digital synthesizer utilizing said period of a register and said instantaneous phase of said phase accumulator;

whereby a time resolution of said output signal is improved.

10. A method of removing low-order alias components from an output signal of a direct digital synthesizer, comprising:

obtaining a period of a register;

obtaining an instantaneous phase of a phase accumulator;

interpolating transitions within clock periods of a clock signal timing said direct digital synthesizer having a 1-bit resolution utilizing said period of a register and said instantaneous phase of said phase accumulator;

whereby a time resolution of said output signal is improved.

11. Apparatus for removing an alias component in an output signal from a discretely timed circuit, comprising:

means for prohibiting a transition in an output signal of said discretely timed circuit if a product of a phase of a phase accumulator and a period of a register are greater than one; and means for allowing a transition in said output signal to occur if said product is less than or equal to one.

12. The apparatus for removing an alias component in an output signal from a discretely timed circuit according to claim 11, wherein:

said means for allowing said transition allows said transition in said output signal within a next clock period from which said product is derived.

13. The apparatus for removing an alias component in an output signal from a discretely timed circuit according to claim 11, wherein:

said discretely timed circuit includes a direct digital synthesizer.

14. Apparatus for removing an alias component in an output analog signal from a discretely timed circuit, comprising:

means for multiplying to produce a product of a phase accumulator signal and a period register signal for output to a means for interpolating; and means for intentionally moving in said means for interpolating a position of a transition in time in a digital signal input to said apparatus, before conversion into an analog signal, based on a comparison of a desired signal to an input sample of said digital signal.

15. The apparatus for removing an alias component in an output analog signal from a discretely timed circuit according to claim 14, wherein:

said interpolator interpolates between a value of a desired output signal and a varying reference signal.

16. Apparatus for removing an alias component in an output analog signal from a discretely timed circuit, comprising:

means for comparing a desired signal to an input sample of a digital signal input to said apparatus;

means for intentionally moving in said interpolator a position of a transition in time in said digital signal, before conversion into an analog signal, based on said comparison of said desired signal to an input sample of said digital signal;

whereby said interpolator interpolates between a value of a desired output signal and a varying reference ramp signal.

17. Apparatus for removing an alias component in an output analog signal from a discretely timed circuit, comprising:

means for comparing a desired signal to an input sample of a digital signal input to said apparatus;

means for intentionally moving in said interpolator a position of a transition in time in said digital signal, before conversion into an analog signal, based on said comparison of said desired signal to an input sample of said digital signal;

wherein said interpolator interpolates between a value of a desired output signal and a varying reference ramp signal; and wherein said ramp signal repeats each clock cycle.

18. The apparatus for removing an alias component in an output analog signal from a discretely timed circuit according to claim 14, wherein:

said interpolator inputs a digital signal and outputs an analog signal.

\* \* \* \* \*